Feb. 23, 1965  J. F. FLODIN  3,170,528
CARTON FILLING AND WEIGHING DEVICE
Filed Jan. 8, 1963  3 Sheets-Sheet 1

John F. Flodin
INVENTOR.

John F. Flodin
INVENTOR.

Feb. 23, 1965   J. F. FLODIN   3,170,528
CARTON FILLING AND WEIGHING DEVICE
Filed Jan. 8, 1963   3 Sheets-Sheet 3

John F. Flodin
INVENTOR.

United States Patent Office 3,170,528
Patented Feb. 23, 1965

3,170,528
CARTON FILLING AND WEIGHING DEVICE
John F. Flodin, Sunnyside, Wash., assignor to Flodin Inc., Sunnyside, Wash., a corporation of Washington
Filed Jan. 8, 1963, Ser. No. 250,069
4 Claims. (Cl. 177—52)

This invention relates to improvement in carton filling and weighing machines and more particularly, relates to compact apparatus for handling of cartons or containers, loading said containers with articles such as produce, weighing the cartons being loaded and delivering the cartons when loaded by a predetermined amount.

It is therefore a primary object of the present invention to provide a compact machine capable of being utilized with a continuously operative conveyor supplying empty cartons or containers, to the machine.

An additional object of the present invention is to provide a machine for handling empty cartons continuously supplied thereto in timed relation to the loading of the containers with produce.

A still further object of the present invention is to provide a container handling device operative to deliver the containers loaded with a predetermined weight of produce.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
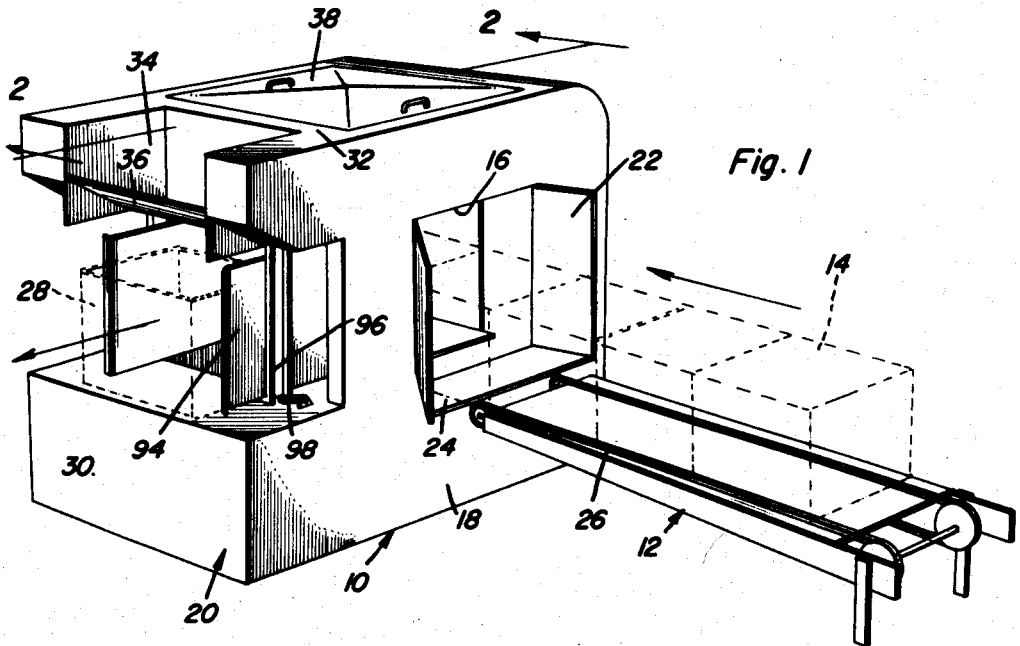
FIGURE 1 is a perspective view of the container filling and weighing device of the present invention.

Referring now to the drawings in detail, it will be observed from FIGURE 1 in particular, that the carton handling, filling and weighing device of the present invention is generally referred to by reference numeral 10 and is associated with a continuously operative conveyor 12 positioned in close adjacency thereto. The conveyor 12 is operative to continuously deliver any containers or cartons 14 to an inlet opening 16 formed in a side wall 18 of the housing 20 enclosing the mechanism of the machine 10. Accordingly, projecting side guide panels 22 and bottom panel 24 are connected to the side wall 18 of the housing 20 about the inlet opening 16 so as to guidingly receive therethrough empty cartons 14 being continuously urged into the inlet opening by means of continuous movement of the conveyor belts 26 of the carton feeding conveyor 12. Loaded cartons 28 are discharged from the housing of the machine in a direction perpendicular to the direction of movement of the empty cartons 14 into the machine. The housing 20 is therefore provided with an inwardly recessed front wall portion 30 perpendicular to the inlet side wall portion 18. Also formed between the upper portion of the front wall portion 30 of the housing and the top wall portion 32 thereof, is a produce feeding chute or hopper 34 including a pivotally mounted gate member 36 which is normally disposed in a downwardly inclined position so as to downwardly guide the movement of produce into the carton being loaded located at a loading station prior to being discharged or delivered therefrom. As will be hereafter explained, the gate member 36 may be pivotally displaced upwardly so as to close off the bottom of the hopper chute 34 when a fully loaded carton 28 is discharged from the machine by an empty carton being displaced toward the loading station. The machine housing 20 is also provided with access door or closure lid 38 in the top wall portion 32 thereof by means of which repairs and internal inspection of the machine is accomplished.

Figure 4:
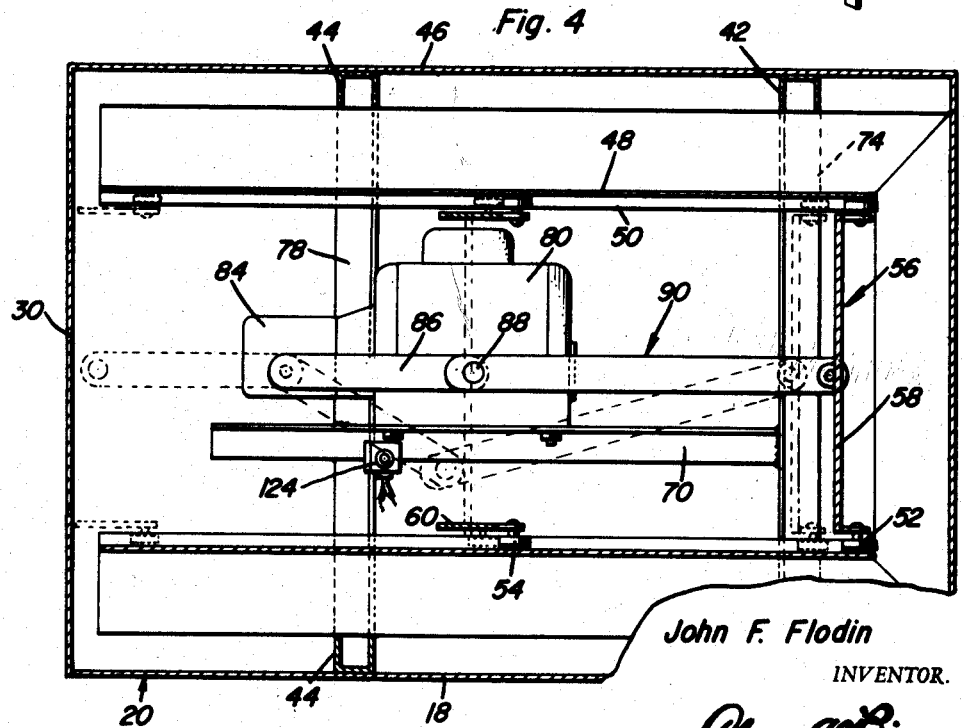
FIGURE 4 is a partial sectional view taken substantially through a plane indicated by section line 4—4 in FIGURE 2.
Figure 2:
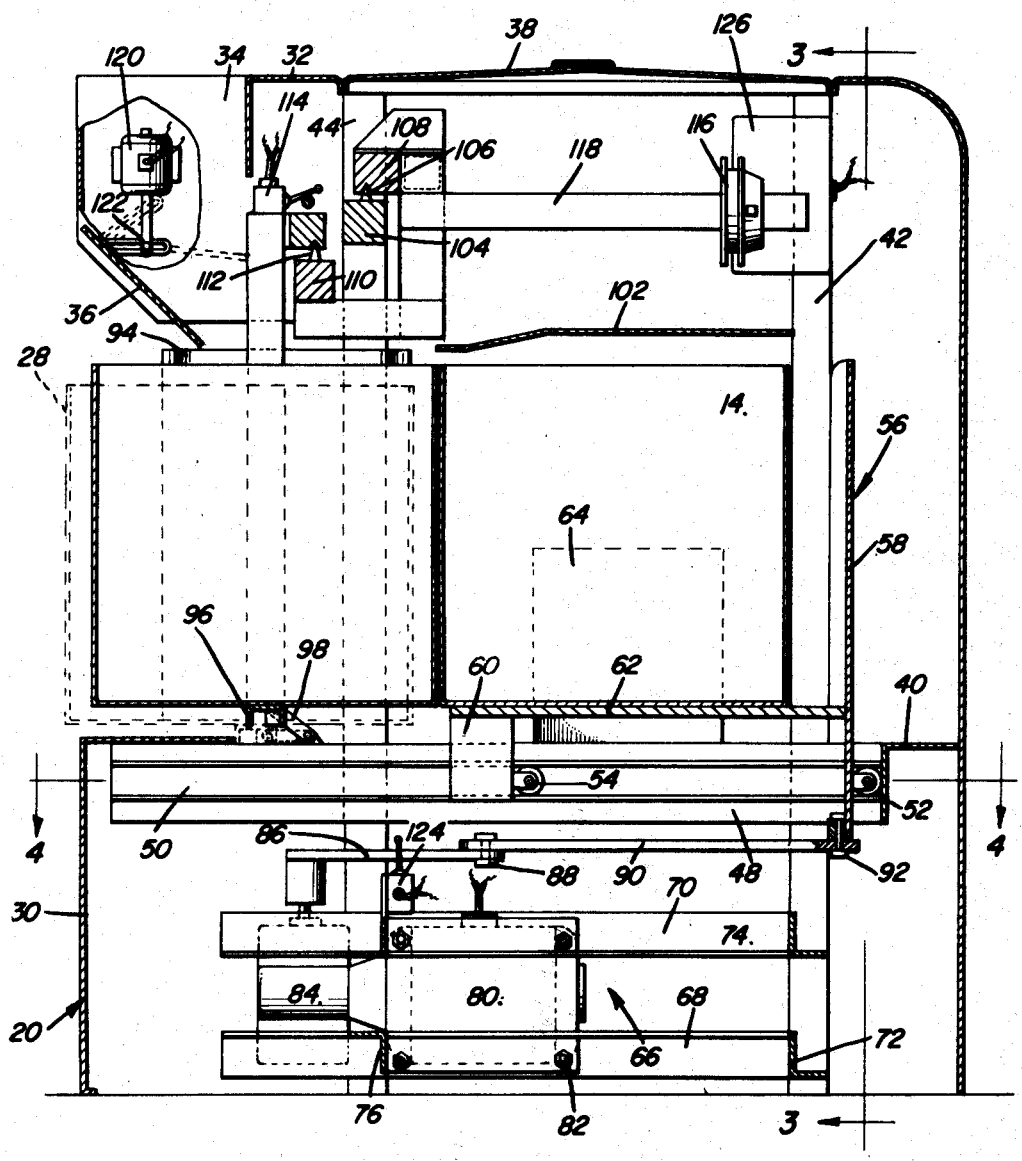
FIGURE 2 is a sectional view taken substantially through a plane indicated by section line 2—2 in FIGURE 1.
Figure 3:
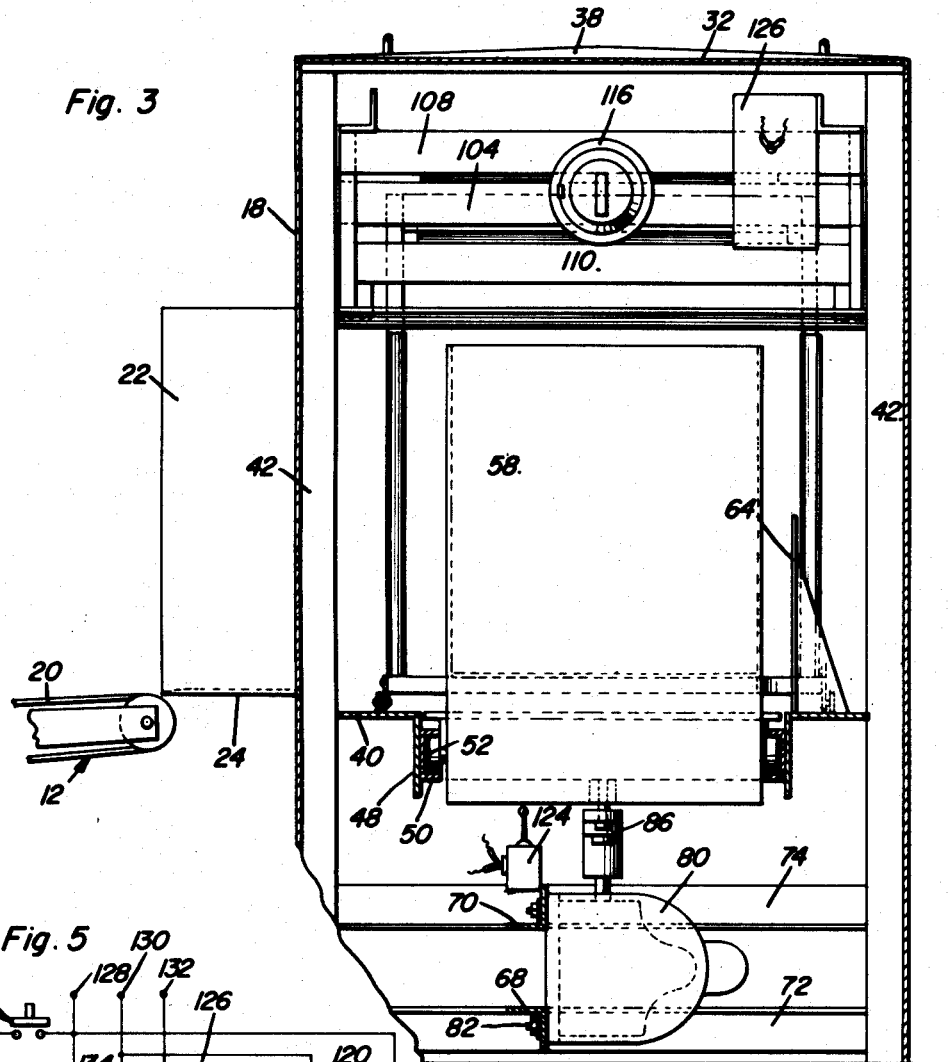
FIGURE 3 is a partial sectional view taken substantially through a plane indicated by section line 3—3 in FIGURE 2.

Referring now to FIGURES 2, 3 and 4, it will be observed that the base portion of the housing 20 is defined below a horizontal supporting member 40 internally secured to the vertical portions of the housing and spaced from the side wall portions thereof by spaced vertical frame members 42 and 44 respectively secured to both the side wall portion 18 and the side wall 46 on the opposite side of the machine as more clearly seen in FIGURE 4. The horizontal support member 40 defines an opening within the housing 20 between a pair of downwardly depending parallel guide members 48 having a track formation 50 within which spaced rollers 52 and 54 are received, said rollers being rotatably carried by a carton displacing plunger assembly generally referred to by reference numeral 56. The plunger assembly includes the vertically extending ram member 58 connected to the roller wheels 52 for guiding the plunger assembly between the guide members 48. The roller wheels 54, on the other hand, are connected to portions 60 depending downwardly from the forward end of a carton supporting member 62 secured to the ram member 58 above the horizontal member 40 and in surface alignment with the conveyor belts 26 of the empty carton feeding conveyor 12. It will be therefore apparent, that the plunger assembly 56 is guided for movement in a direction perpendicular to movement of the empty carton feeding conveyor. When the carton displacing plunger assembly is in the position illustrated, empty cartons 14 may be moved up against a limit back stop member 64 secured to the horizontal support member 40 on the side opposite the inlet opening 16. Empty cartons will accordingly be continuously urged by the conveyor 12 toward a conveyor unloading position when the carton displacing assembly 56 is in its retracted position not blocking the empty cartons. When the carton displacing assembly 56 is rendered operative to move through a predetermined stroke from its retracted position, it will be effective to displace an empty carton from the conveyor unloading postion, blocking delivery of another empty carton until the stroke is completed. In order to impart the predetermined stroke to the carton displacing assembly 56, a powered drive mechanism generally referred to by reference numeral 66 is provided within the base portion of the housing below the horizontal support member 40.

It will be observed, that a pair of vertically spaced frame members 68 and 70 are secured within the base portion of the housing between cross-frame members 72, 74, 76 and 78. An electric motor 80 is mounted within the base portion by means of fastener assemblies 82 secured to the frame members 68 and 70. The motor 80 is drivingly connected to a reduction gear mechanism 84 the output of which is secured to a crank 86. The crank 86 is connected by means of the crank pin 88 to a connecting rod 90 forming therewith a drive linkage for imparting a predetermined reciprocatory stroke to the carton displacing plunger assembly 56. Accordingly, the lower end of the ram member 58 is pivotally connected by the pivot connecting assembly 92 to the connecting rod member 90. The carton displacing assembly will thereby be operative to displace an empty carton to the weighing station from which the carton is discharged after it is fully loaded.

A pair of parallel side guide members 94 are located at the loading station and connected to a scale platform frame member 96 through which the cartons are displaced by the carton displacing mechanism. The scale platform frame and guide members 94, are therefore adapted to guidingly receive empty cartons and support such cartons while being loaded. When loaded by a predetermined amount, the carton supporting frame will be slightly displaced. Accordingly, the carton supporting frame 96 is pivotally connected to the housing by means of a pair of lever links 98 whereby the carton supporting frame may be displaced downwardly and forwardly when fully loaded as indicated by dotted line in FIGURE 2 from the position illustrated by solid line in which the carton supporting frame is held by means of the counterbalancing assembly generally referred to by reference numeral 100.

The counter-balancing assembly is therefore located within an upper portion of the housing 20 above the partition member 102 as more clearly seen in FIGURES 2 and 3. Connected between the vertical frame members 42, within the upper portion of the housing, is a supporting frame member 104 by means of which the counterbalancing assembly 100 is supported on fulcrum edges 106. The assembly 100 thus includes transverse members 108 and 110 which are interconnected at opposite ends thereof with the member 110 being provided with fulcrum edges 112 providing pivotal support for the carton supporting frame member 96 on which is mounted a microswitch 114 adapted to be actuated upon displacement of the carton supporting frame when the load and moment arm to the fulcrum pivot 112 exceeds the product of the adjustable weight 116 and its moment arm to the fulcrum edge 106. Accordingly, the weight 116 is adjustably positioned along a supporting arm 118 extending rearwardly from the fulcrum supporting member 104 and connected to the members 108 and 110. It will therefore be apparent, that loading of a carton by a predetermined weight will be effective to displace the carton supporting frame 96 when the counter-balancing moment of the counter-balancing assembly 100 is exceeded. Upon such displacement of the carton supporting frame, the microswitch 114 is actuated and as a result thereof, the carton displacing assembly 56 is moved through its predetermined stroke so as to displace an empty carton toward the loading station and discharge from the loading station, the preceding loaded carton. When the displacing assembly 56 is so moved by energization of the motor 80, a feed control solenoid 120 is energized so as to upwardly pivot the gate 36 by means of the linkage connection 122 as more clearly seen in FIGURE 2. The cycle is completed when the carton displacing assembly 56 is returned to its retracted position in which it is held so as to receive another empty carton and to await displacement once again when the weight sensing microswitch 114 is actuated in a manner as hereinbefore described. In order to deenergize the motor 80 and the feed control solenoid 120 so that the carton displacing assembly will stop at its retracted position and the gate 36 reopened at the end of a cycle, a cycle control microswitch 124 is mounted adjacent the intersection of the frame members 70 and 78 so that it may be engaged and actuated by means of the crank 85 as it approaches the end of a cycle of movement. Actuation of the weight sensing switch 114 and the cycle control switch 124 are operative through the motor control assembly 126 to intermittently energize the motor 80 and the control solenoid 120 in proper phase so as to achieve the aforementioned functions of the machine. The motor control 126 is therefore conveniently mounted within the housing as for example within the upper portion thereof below the access door 38 so that it may be serviced, the control assembly 126 being properly wired to the motor 80 and the control solenoid 120 as well as to the microswitches 114 and 124.

Figure 5:
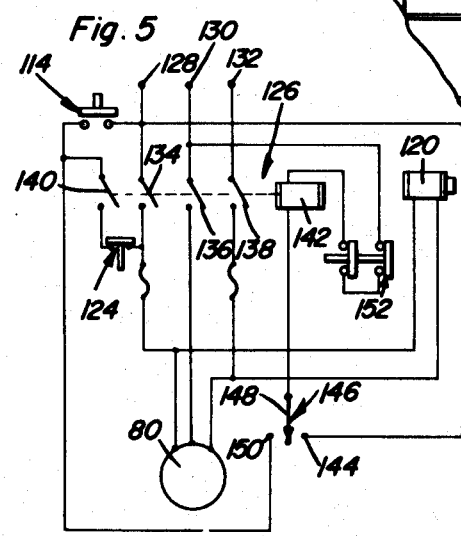
FIGURE 5 is an electrical circuit diagram illustrating the control system associated with the present invention.

Referring therefore to FIGURE 5 in particular, it will be observed that the motor 80 is connected to a three phase source of electrical energy by means of the terminals 128, 130 and 132. The motor control 126 includes normally open relay switches 134, 136 and 138 adapted to interrupt the power lines by means of which the terminals are connected to the motor 80. A fourth relay switch 140 is provided and all of the relay switches are adapted to be closed upon energization of a control solenoid 142 shown deenergized in FIGURE 5. The terminal 128 is electrically connected to the weight sensing switch 114 and to contact 144 of the selector switch assembly 146 shown in an inoperative circuit opening position in FIGURE 5. The selector switch assembly therefore includes the contact arm 148 having two operative positions including a non-automatic position in engagement with the contact 144 and an automatic position when in engagement with the contact 150 which is electrically connected to the weight sensing switch 114 and the relay switch 140. The relay switch 140 is also electrically connected by the normally closed cycle switch 124 to one of the power lines to the motor 80. Also connected across two of the power lines of the motor 80 is the feed control solenoid 120 which is thereby arranged to be energized simultaneously with energization of the motor 80. It will therefore be apparent, that when the motor 80 is energized so as to render the carton displacing assembly 56 operative to displace an empty carton toward the loading station below the feed chute 34, the feed control solenoid 120 will also be energized so as to close the gate 36 to prevent delivery of produce or other articles during displacement of the cartons. Energization of the motor 80 will therefore be effected upon closing of the weight sensing switch 114 should the selector arm 148 be in the automatic position since upon closing of the switch 114, a circuit will be established from the terminal 128 through the selector switch arm 148 to the motor control solenoid and from the solenoid 142 through the normally closed stop switch 152 to the power terminal 130 causing the motor control solenoid 142 to be energized. Energization of the solenoid 142 will close all of the relay switches so as to energize the motor 80 and also establish through the relay switch 140 and the closed cycle switch 124, energizing circuits for the solenoids 120 and 142 bypassing the weight sensing switch 114. The motor 80 and the control solenoid 120 will therefore remain energized so that the carton displacing assembly 56 may complete its cycle of movement before the motor 80 is de-energized and the solenoid 120 de-energized so that the gate 36 may be opened. Opening of the energizing circuits for the feed control solenoid 120 and the motor control solenoid 142 will be effected by opening of the cycle switch 124 as the drive linkage for the carton displacing assembly approaches the end of its cycle of movement as hereinbefore indicated. Thereafter, closing of the weight sensing switch 114 will again initiate a cycle. It will therefore be appreciated, that movement of the selector arm 148 to the automatic position for engagement with the contact 150, will cause intermittent delivery of predetermined quantities of produce in cartons. Should it be desired to control the filling of the cartons and weighing thereof manually, the selector switch assembly 146 may be positioned to the manual position in which case, the weight sensing switch 114, relay switch 140 and cycle switch 124 will be cut out of the circuit, control over the energization of the solenoids 120 and 142 then being accomplished through the stop switch 152.

From the foregoing description, the operation and utility of the present invention will be apparent. It will therefore be appreciated, that the machine of the present invention is adapted to be used in connection with a continuously operative empty carton feeding conveyor and may be automatically or manually controlled for receiving empty cartons from the supply conveyor, filling the cartons with any desired quantity of produce or other articles and ejecting the cartons when loaded.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a container filling and weighing machine, conveyor means continuously operative to urge empty containers toward a conveyor unloading position, means intermittently operative for displacing empty containers from said unloading position to a loading position removed from the urge of the conveyor means, feeding means rendered operative during inoperative periods of said intermittently operative displacing means to load the containers at said loading position, and weight sensing control means operatively connected to said feeding means and the displacing means to render the displacing means operative to displace an empty container against a loaded container for discharge thereof from the loading position, said displacing means comprising, plunger means slidably mounted in spaced relation to a delivery end of said conveyor means for movement perpendicular to movement of the conveyor means to receive and block movement of containers on the conveyor means, motor means mounted below said plunger means, linkage means drivingly connecting said motor means to the plunger means for movement of the plunger means through a predetermined stroke and cycle control means engageable by the linkage means for deenergizing the motor means upon completion of said stroke.

2. The combination of claim 1, wherein said feeding means comprises a hopper mounted above said loading position of the cartons, normally open gate means mounted in the hopper through which articles are deposited into the containers and feed control means operatively connected to the gate means for closing thereof when energized.

3. The combination of claim 2, wherein said weight sensing control means comprises support means guidingly receiving and supporting the containers, counterbalanced means displaceably mounting the support means for displacement in response to a predetermined load thereon, switch means mounted on the support means and actuated in response to displacement thereof, and means responsive to actuation of the switch means for rendering the displacing means operative.

4. A carton filling and weighing machine in combination with a continuously operative conveyor for moving empty cartons comprising limit means engageable by each empty carton to hold each carton in a first predetermined position, carton displacing means rendered operative to move through a predetermined stroke for displacing each carton from said first predetermined position while preventing movement of said empty cartons by the conveyor to said first predetermined position, article feeding means rendered operative to load articles into each empty carton when displaced to a second predetermined position, means responsive to predetermined loading of each carton at said second predetermined position for rendering said carton displacing means operative to displace an empty carton and discharge a loaded carton, and cycle control means operatively engageable by the carton displacing means to render the article feeding means operative and the carton displacing means inoperative to release an empty carton for movement by the conveyor into engagement with said limit means.

References Cited by the Examiner

UNITED STATES PATENTS

| | | | |
|---|---|---|---|
| 888,615 | 5/08 | Humphreys | 177—52 |
| 1,262,256 | 4/18 | Redd | 177—52 |
| 1,374,876 | 4/21 | Bond | 177—53 |
| 1,729,991 | 10/29 | Bond | 177—53 |
| 1,776,897 | 9/30 | Gangler | 177—53 |
| 2,319,908 | 5/43 | Walter | 177—57 |
| 2,595,035 | 4/52 | Willbrandt | 177—53 |

LEO SMILOW, *Primary Examiner.*